(12) United States Patent
Hirota et al.

(10) Patent No.: US 9,573,309 B2
(45) Date of Patent: Feb. 21, 2017

(54) SYSTEM FOR FEEDING MOLTEN RESIN AND METHOD OF FEEDING MOLTEN RESIN

(75) Inventors: Norihisa Hirota, Kanagawa (JP);
Yutaka Asano, Kanagawa (JP);
Toshifusa Azuma, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 471 days.

(21) Appl. No.: 14/003,085

(22) PCT Filed: Mar. 8, 2012

(86) PCT No.: PCT/JP2012/055950
§ 371 (c)(1),
(2), (4) Date: Sep. 4, 2013

(87) PCT Pub. No.: WO2012/121325
PCT Pub. Date: Sep. 13, 2012

(65) Prior Publication Data
US 2013/0334728 A1    Dec. 19, 2013

(30) Foreign Application Priority Data

Mar. 10, 2011   (JP) .................................. 2011-053282

(51) Int. Cl.
*B29C 47/00* (2006.01)
*B29C 31/04* (2006.01)
(Continued)

(52) U.S. Cl.
CPC ........... *B29C 47/004* (2013.01); *B29C 31/048* (2013.01); *B29C 43/34* (2013.01); *B29C 2043/046* (2013.01); *B29C 2043/3623* (2013.01)

(58) Field of Classification Search
CPC .................................................... B29C 47/004
(Continued)

(56) References Cited

U.S. PATENT DOCUMENTS 6,368,094 B1    4/2002   Dennis et al.
7,776,245 B2    8/2010   Kawaguchi et al.
(Continued)

FOREIGN PATENT DOCUMENTS

EP    1101587       5/2001
EP    2263848      12/2010
(Continued)

OTHER PUBLICATIONS

International Search Report dated Apr. 3, 2012 in PCT/JP2012/055950.
(Continued)

*Primary Examiner* — Larry Thrower
(74) *Attorney, Agent, or Firm* — Greenblum & Bernstein, P.L.C.

(57) ABSTRACT

To efficiently feed a molten resin to the resin holders. An intermittently feeding device works to intermittently feed a transfer unit equipped with resin holders, and has a cam supported by a motor via a support. The cam is rotated by the motor. A cam follower of a moving block meshes with the screw of the cam, and the moving block moves along a support rail accompanying the turn of the cam. The motor rotates at a constant speed, and the transfer unit 3 is fed intermittently depending on the shapes of the cam and of the cam follower.

2 Claims, 11 Drawing Sheets

(51) Int. Cl.
*B29C 43/34* (2006.01)
*B29C 43/04* (2006.01)
*B29C 43/36* (2006.01)

(58) Field of Classification Search
USPC .......................................................... 425/340
See application file for complete search history.

(56) References Cited

U.S. PATENT DOCUMENTS

| | | | |
|---|---|---|---|
| 8,007,266 | B2 | 8/2011 | Parrinello et al. |
| 8,162,654 | B2 | 4/2012 | Monzen et al. |
| 8,168,100 | B2 | 5/2012 | Yoneda et al. |
| 8,277,211 | B2 | 10/2012 | Parrinello et al. |
| 2002/0017742 | A1* | 2/2002 | Kikuchi .............. B29B 17/0042 264/333 |
| 2004/0253429 | A1 | 12/2004 | Polk et al. |
| 2009/0014915 | A1 | 1/2009 | Asano et al. |
| 2009/0035408 | A1 | 2/2009 | Rote et al. |
| 2010/0189832 | A1 | 7/2010 | Monzen et al. |
| 2010/0201032 | A1 | 8/2010 | Asano et al. |

FOREIGN PATENT DOCUMENTS

| | | |
|---|---|---|
| JP | 5968206 | 4/1984 |
| JP | 2-134222 | 5/1990 |
| JP | 06-20776 | 3/1994 |
| JP | 2000-108127 | 4/2000 |
| JP | 2007-229981 | 9/2007 |
| JP | 2007-296693 | 11/2007 |
| JP | 2007-533507 | 11/2007 |
| JP | 2009-73095 | 4/2009 |
| JP | 2009-226609 | 10/2009 |
| WO | 2009/018190 | 2/2009 |

OTHER PUBLICATIONS

China Office action in CN 201280019523.X, dated Dec. 26, 2014 along with an English translation thereof.
Korea Office action in KR 10-2013-7026378, mail date is Apr. 30, 2015.
Extended European Search Report in respect to European Application No. 12755683.5, dated Mar. 23, 2016.
Japanese Office Action in respect to Japanese Application No. 2013-503596, dated Jan. 19, 2016.

* cited by examiner

Fig. 9
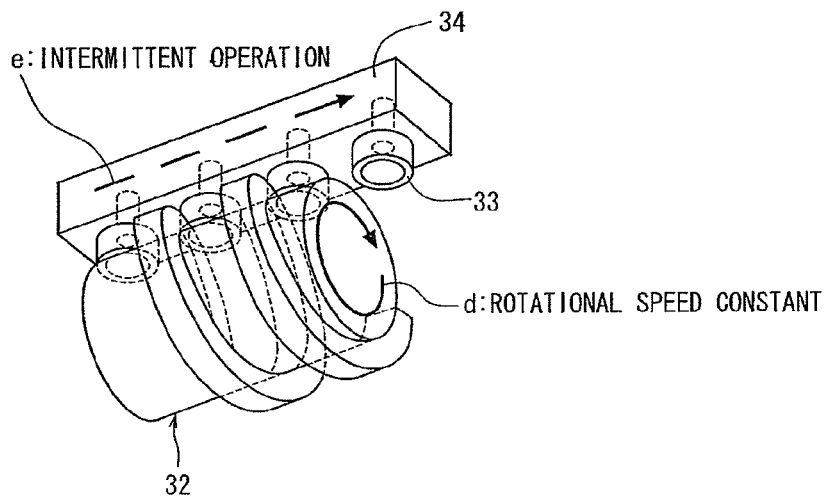
e: INTERMITTENT OPERATION
34
33
d: ROTATIONAL SPEED CONSTANT
32
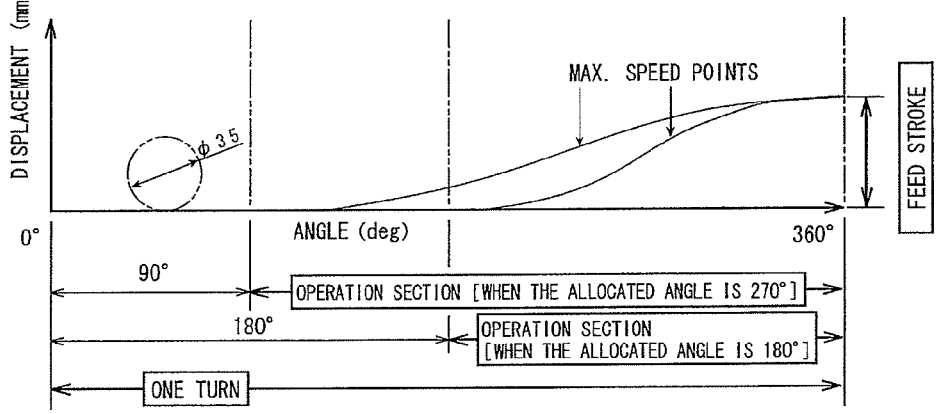
DISPLACED CURVES OF A CAM
(EX: DEFORMED SINUSOIDAL CURVES)

Fig. 10
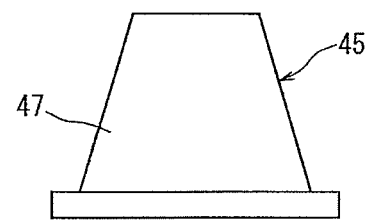
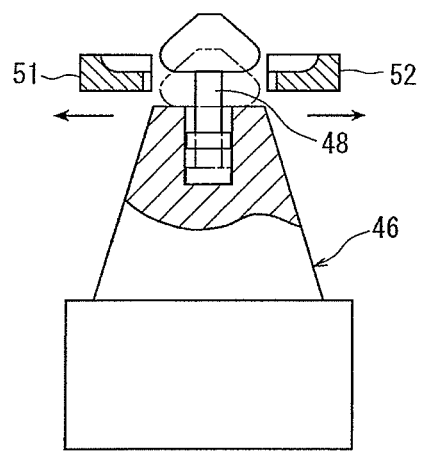

SYSTEM FOR FEEDING MOLTEN RESIN AND METHOD OF FEEDING MOLTEN RESIN

TECHNICAL FIELD

This invention relates to a system for feeding a molten resin, which is capable of quickly feeding a molten resin to a plurality of metal molds and to a method of feeding a molten resin.

BACKGROUND ART

Conventional compression forming machines can be classified into rotary forming machines and fixed type press forming machines.

In a rotary compression forming machine, a plurality of metal molds are arranged along the circumferential direction of a turntable, and the molten resin is fed as the resin holder lets the molten resin fall into the metal mold at a hand-over point where the resin holder rotated and conveyed from the molten resin-feeding device overlaps the metal mold along their rotary tracks (patent document 1).

In a fixed type press forming machine, on the other hand, the metal molds of the compression forming machine are arranged a nearly radial manner about the extrusion port of the extruder, a conveyer means (resin holder) that holds the molten resin is provided between the metal molds and the extrusion port, the conveyer means being so arranged as to move straight outward in the radial direction with the extrusion port nearly as a center, the molten resin cut from the extrusion port by the cutter accompanying the motion of the conveyer means is held by the conveyer means, and the molten resin is fed by a drive mechanism to the metal mold (patent document 2).

PRIOR ART DOCUMENTS

Patent Documents

Patent document 1: JP-A-2007-229981
Patent document 2: JP-A-2009-226609

OUTLINE OF THE INVENTION

Problems that the Invention is to Solve

The rotary compression forming machine and the fixed type press forming machine have their advantages and disadvantages. Namely, the rotary compression forming machine has an advantage of high productivity accompanied, however, by a disadvantage of large-load forming which is difficult to conduct requiring cumbersome positioning of the molten resin since the metal mold is moving.

The fixed type press forming machine has an advantage of easy large-load forming enabling the molten resin (drop) that is cut to be easily positioned since the molten metal has been fixed, but has a disadvantage of low productivity. That is, advantages and disadvantages are conflicting between the rotary compression forming machine and the fixed type press forming machine.

First, the productivity of the fixed type press forming machine will be described. The metal molds of the compression forming machine are arranged nearly in a radial manner about the extrusion port of the extruder. Therefore, the metal molds must be arranged outward in the radial direction with an increase in the number of the metal molds and, besides, the distance increases for conveying the molten resin from the extrusion port to the metal molds.

To cut the molten resin extruded from the extrusion port of the extruder by a cutter, it is desired that the speed of the cutter is in a range of 500 to 2,000 mm/s; i.e., this cutting speed must be maintained no matter how the constitution of the machine or the production capability is varied. To increase the production capability, it can be contrived to increase the number of the cutters and to feed more drops to the metal molds.

Here, in an attempt to increase the production capability using the fixed type press forming machine described in the patent document 2, considered below is a case where two cutters are arranged in series in an actuator that is designed to move one cutter, and are moved at an equal speed of 2000 mm/s.

First, if 200 drops are to be cut in one minute, the cutting cycle becomes 0.3 sec (60 s/200 drops). From the cutting speed of the cutter of 2000 mm/s, here, the distance between the cutters arranged in series becomes 600 mm (0.3 s×2000 mm/s); i.e., the distance is large between the cutters causing the apparatus to become bulky, which is difficult to put into practice.

Next, if 600 drops are to be cut in one minute to increase the production capability, the cutting cycle becomes 0.1 sec (60 s/600 drops) and, therefore, the pitch between the resin holders becomes 200 mm (0.1 s×2000 mm/s); i.e., the pitch becomes small but the apparatus is still bulky.

If the cutters are fed at a constant speed as described above, the pitch between the resin holders increases in the conventional fixed type press forming machine causing the apparatus to become bulky and making it difficult to place the apparatus in practical use or to increase the productivity. Therefore, it has been urged to provide a novel method of feeding molten resin drops, which is capable of cutting the drops in a short cycle to improve production capability and which enables the apparatus to be realized in a small size.

The present invention was accomplished in view of the above-mentioned circumstances, and provides a system for feeding a molten resin and a method of feeding a molten resin featuring high productivity yet maintaining advantages of the fixed type press forming machine.

Means for Solving the Problems

To achieve the above object, the present invention provides a system for feeding a molten resin, comprising an extruder for extruding the molten resin through an extrusion port; resin holders for receiving the molten resin from the extrusion port; transfer units equipped with a plurality of the resin holders; and compression forming apparatuses having a plurality of metal molds; wherein provision is made of intermittently feeding devices which vary the moving speed of the transfer units at a moment when the resin holder receives the molten resin; and the intermittently feeding devices feed the transfer units at a feed speed which is zero or is slowed down at a position where the resin holder receives the molten resin so that the molten resin is continually and successively fed into the resin holders from the extrusion port.

In the system for feeding the molten resin, provision is made of the compression forming apparatuses and the pair of the transfer units on both sides of the extrusion port, the extrusion port being positioned therebetween; and the transfer units are provided with a lift, and are alternately transferred to a position to receive the molten resin in a manner that one transfer unit travels under the other transfer unit enabling the molten resin to be continually fed to the resin holders.

In the system for feeding the molten resin, the metal molds are disposed in a plurality of rows in the compression forming apparatuses; the transfer units are provided with a file-off mechanism for filing off the resin holders from a state of one row to a plurality of rows, the file-off mechanism aligning the resin holders in one row at the molten resin extrusion port and filing off the resin holders to a plurality of rows to meet the positions of the metal molds at the time of feeding the molten resin to the metal molds.

In the system for feeding the molten resin, provision is further made of conveyer devices for moving the transfer units straight to the metal molds, and change-over devices for changing over the intermittently feeding devices and the conveyer devices for the transfer units.

In order to achieve the above object, further, the present invention provides a method of feeding a molten resin by cutting the molten resin extruded from the extrusion port, successively feeding the molten resin from the extrusion port to each of the plurality of resin holders, and feeding the molten resin from the plurality of resin holders to a plurality of metal molds, wherein the resin holders are intermittently fed in a manner that the feed speed of the resin holders increases at a position where the molten resin is cut, and is brought to zero or is slowed down at a position where the molten resin is received.

In the method of feeding the molten resin, the plurality of resin holders are disposed in the transfer units which are provided in a plural number; the transfer units circulate between a resin-receiving position where the resin holders receive the molten resin and a resin-feeding position where the resin holders feed the molten resin to the metal molds; and while the resin holders in one transfer unit are receiving the molten resin, the other transfer unit travels through under the one transfer unit and stands by behind the one transfer unit, and after the molten resin has been fed to the final resin holder in the one transfer unit, the molten resin is continually and successively held by the resin holders in the other transfer unit.

Effects of the Invention

The present invention is provided with the intermittently feeding devices to intermittently feed the resin holders making it possible to decrease the pitch between the resin holders. Therefore, the row of the resin holders does not become so long despite the resin holders are aligned in one row (in series), and the apparatus can be realized in a small size.

Since the resin holders are intermittently fed by the intermittently feeding devices, the molten resin can be received when the resin holder is halted or is slowly moving while being intermittently transferred.

Upon using the transfer units in a pair, the other transfer unit can be rendered stand by behind the one transfer unit while the resin holders of the one transfer unit are receiving the molten resin making it possible to continually and smoothly feed the molten resin.

The transfer units are capable of changing the resin holders from the state of one row into the state of a plurality of rows. Therefore, the length of the metal molds can be shortened in the compression forming apparatus, and the length of the apparatus can be minimized.

In receiving the molten resin from the extrusion port, the arrangements of the transfer units can be shunted up and down by the lift means; i.e., the transfer units can be shunted requiring a small space. Besides, movement of the transfer units does not become complex.

BRIEF DESCRIPTION OF THE DRAWINGS

FIG. 9 includes an enlarged view of the intermittently feeding device, a cam and a moving block, and a diagram showing displacement curves of the cam.

FIG. 10 is a side view of the metal mold of the compression forming apparatus.

MODE FOR CARRYING OUT THE INVENTION

An embodiment of a system for feeding a molten resin and a method of feeding a molten resin according to the present invention will now be described with reference to the accompanying drawings.

Figure 1:
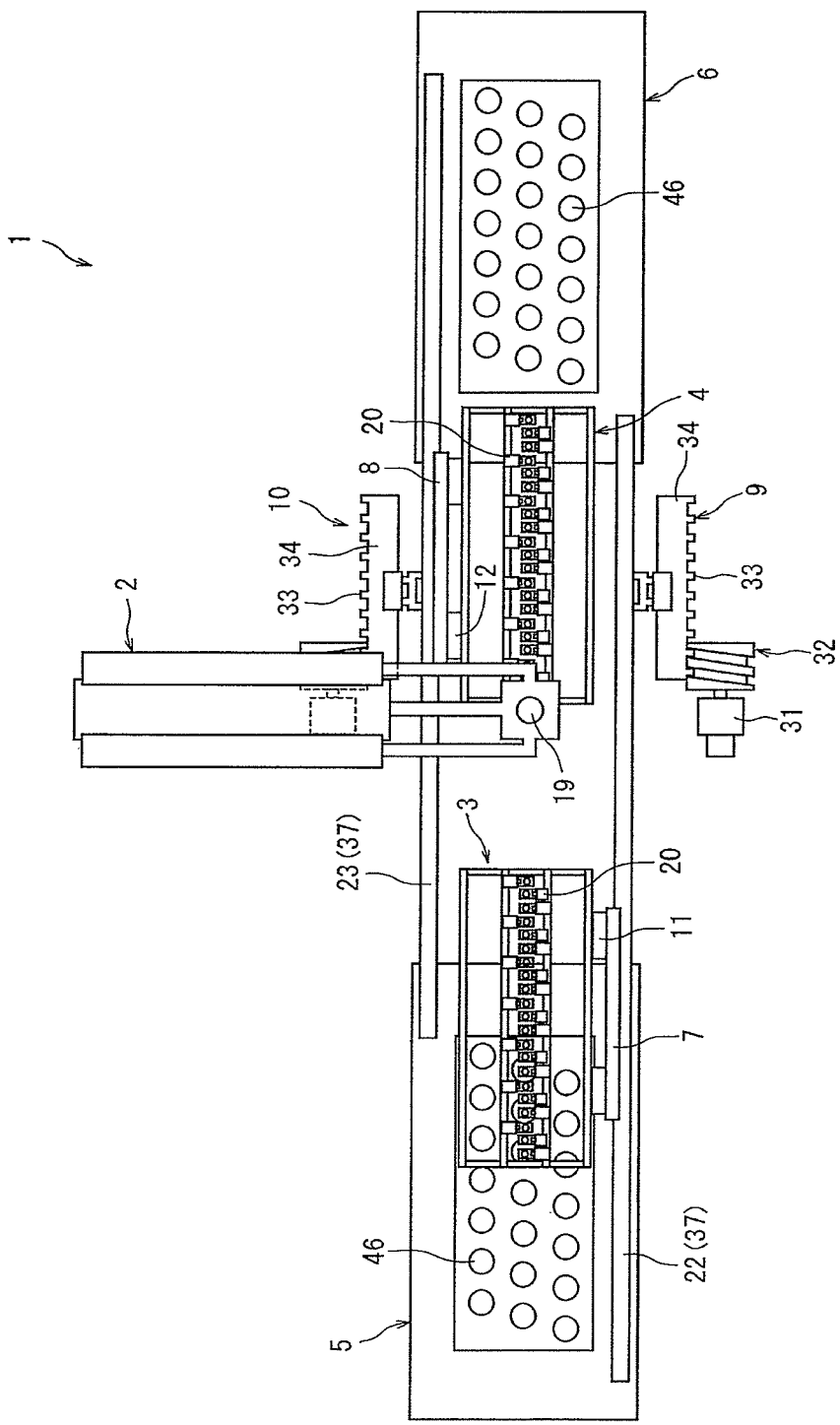
FIG. 1 is a plan view (third step) of a system for feeding a molten resin of the invention.
Figure 2:
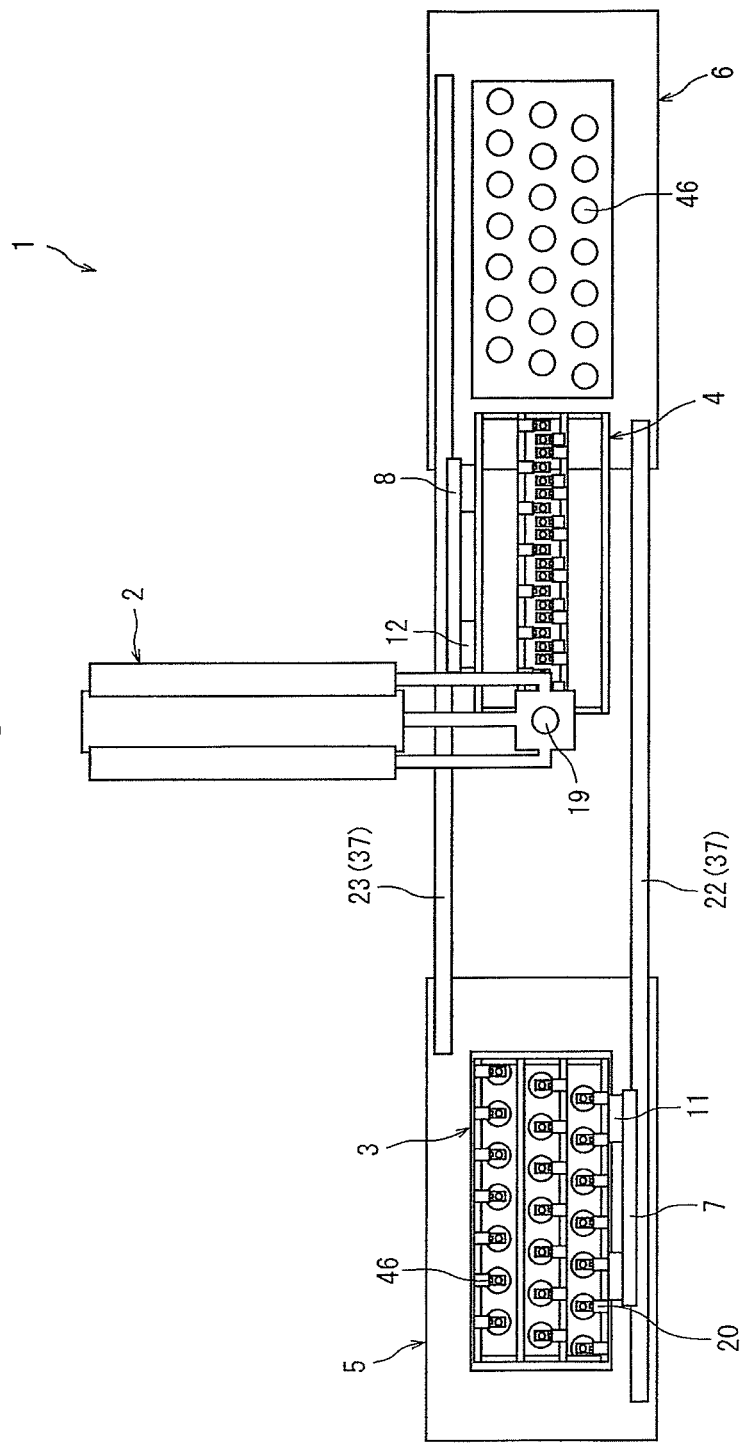
FIG. 2 is a plan view (fourth step: omitting the intermittently feeding device) of the system for feeding the molten resin of the invention.

FIGS. 1 and 2 are plan views (intermittently feeding devices are omitted in FIG. 2) schematically illustrating the system for feeding the molten resin of the invention. The system 1 for feeding the molten resin includes an extruder 2, transfer units 3 and 4 equipped with resin holders 20 for holding the molten resin, intermittently feeding devices 9 and 10 for intermittently moving the transfer units 3 and 4 so that the resin holders 20 receive the molten resin, conveyer devices 7 and 8 for conveying the transfer units 3 and 4 from the extruder 2 up to the compression forming apparatuses 5 and 6, and change-over devices 11 and 12 for changing the transfer units 3 and 4 from the intermittently feeding devices 9 and 10 over to the conveyer devices 7 and 8.

The extruder 2 is provided with a gear pump (not shown) which heats, melts and kneads the synthetic resin materials such as polyethylene terephthalate and the like and stably conveys the molten resin. The gear pump is connected to an extrusion nozzle via a conduit. The extrusion nozzle has an extrusion port 19 formed in the lower end of the nozzle, and the molten resin is extruded from the extrusion port 19 continuously and downwardly in nearly a cylindrical shape.

Figure 3:
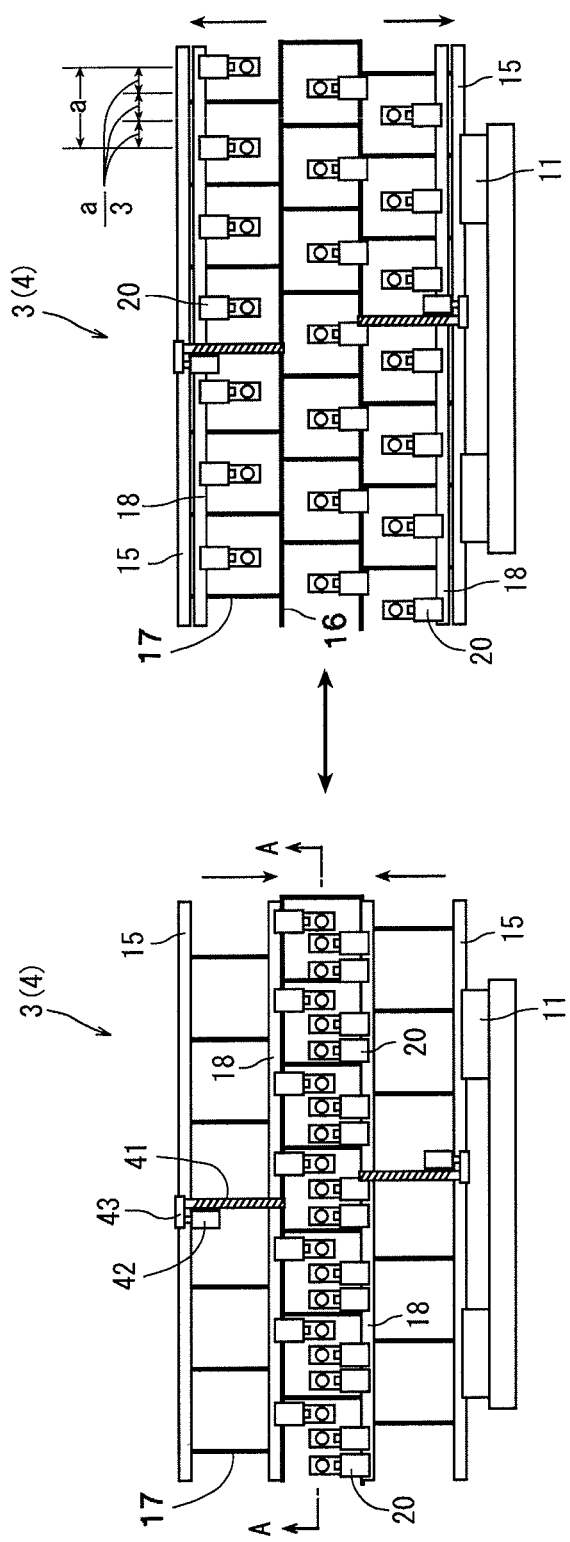
FIG. 3 is a plan view showing the state where the resin holders are aligned in one row (left in the drawing) and the state where the resin holders are filed off into three rows (right in the drawing) by a transfer unit.

Referring to FIG. 3, the transfer units 3 and 4 provided in a pair have the same structure and, therefore, the first transfer unit 3 only will be described below. The transfer unit 3 has a pair of frames 15 arranged facing each other, and has two longitudinal frames 16 between the frames 15 in parallel with the frames 15. Between the frames 15 and the longitudinal frames 16, and between the longitudinal frames 16, there are arranged a number of transverse frames 17 in a direction at right angles with the frames 15. The transfer unit 3 is provided with a pair of slide bars 18 that can move on the transverse frames 17 in the direction in which the transverse frames 17 extend, the slide bars 18 being arranged in parallel with the frames 15.

A ball screw 41 is coupled to the slide bar 18, the ball screw 41 extending in a direction in which the slide bar 18 moves and being coupled to a drive motor 42 via a timing belt 43. As the drive motor 42 rotates, the slide bar 18 moves inward of the transfer unit 3 (at right angles with the frames 15) along the ball screw 41.

One of the longitudinal frames 16 and the pair of slide bars 18 are provided with many resin holders 20. In this embodiment, seven resin holders 20 are provided for each longitudinal frame 17 and for each slide bar 18.

If each slide bar 18 moves inward of the frame 15, a total of 21 resin holders 20 inclusive of the resin holders 20 attached to the longitudinal frame 16 and the resin holders attached to the slide bar 18 are aligned along a straight line maintaining an equal distance.

If closely described, the resin holders 20 attached to the slide bar 18 on the upper side in FIG. 3 (right drawing) are arranged maintaining an equal distance a. The resin holders 20 attached to the longitudinal frame 16 thereunder are arranged being deviated by ⅓a relative to the resin holders 20 of the slide bar 18. Further, the resin holders 20 attached to the slide bar 18 on the lower side on the surface of the paper are arranged being deviated by ⅔a relative to the resin holders 20 attached to the upper side. As described above, the transfer units 3 and 4 are provided with file-off mechanisms for rearranging the resin holders 20 from one row into three rows.

Figure 4:
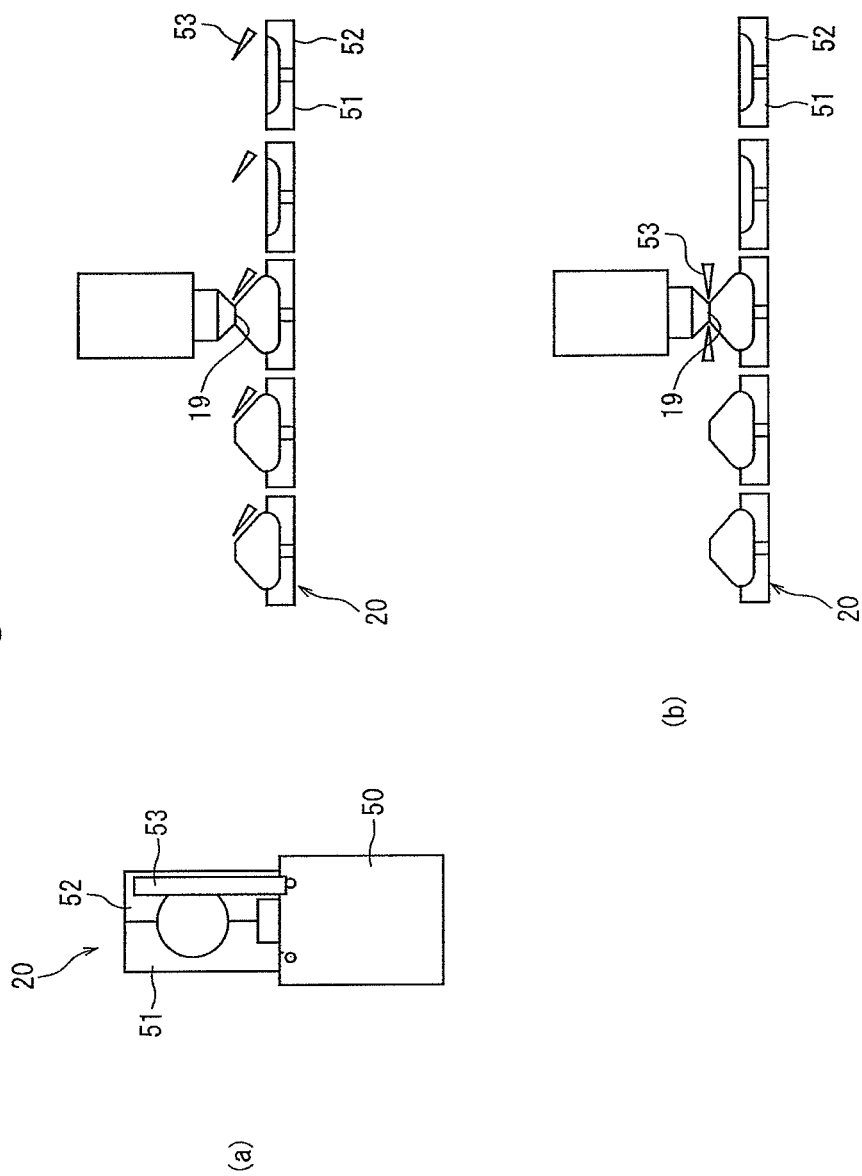
FIG. 4(a) is a plan view of a resin holder, the upper side of (b) is a sectional view of when a cutter is disposed in the resin holder as viewed from the side surface thereof and the lower side thereof is a sectional view of when the cutter is disposed near the extrusion port as viewed from the side surface thereof.

Referring to FIG. 4(*a*), the resin holder 20 has a holder opening/closing mechanism 50 which supports a pair of holder bodies 51, 52 so as to be opened and closed, is capable of holding the molten resin when the holder bodies 51, 52 are closed, and releases the molten resin when the holder bodies 51, 52 are opened. Each resin holder 20 has a cutter 53 which cuts the molten resin discharged from the extrusion port 19 of the extruder 2. The molten resin (drop) after cut is held by the holder bodies 51 and 52. The holder bodies 51 and 52 are arranged at such positions that they will not be overlapped up and down with respect to the longitudinal frames 16 and the transverse frames 17 even before and after the slide bars 18 have moved.

Referring to the left drawing in FIG. 3, the resin holders 20 receive the molten resin from the extrusion port 19 of the extruder 2 at a position in a state where they are aligned in a one at the center. In a state where they have moved toward the frames 15 shown in the right drawing in FIG. 3, the resin holders 20 are brought to a position to feed the molten resin to the metal molds (this will be described later).

Next, described below is a mechanism for conveying the transfer units 3 and 4.

The first transfer unit 3 shown in FIG. 1 is supported by a support rail 22 via a change-over device 11 and the second transfer unit 4 is supported by a support rail 23 via a change-over device 12. The change-over devices 11, 12, conveyer devices 7, 8, and intermittently feeding devices 9, have the same structures. Therefore, described below are the change-over device 11, conveyer device 7 and intermittently feeding device 9 of the one side only.

Referring to FIGS. 5 to 8, the conveyer device 7 and intermittently feeding device 9 are provided on one support rail 22.

The frame 15 of the transfer unit 3 is provided with a support block 25 which fits to the support rail 22 and moves along the support rail 22. An actuator 26 which is lift means is provided on the side surface of the support block 25, and the frame 15 of the change-over device 11 moves up and down being driven by the actuator 26. The actuator 26 can be such a driving means as an air cylinder or a motor.

A locking member 28 for coupling to the intermittently feeding device 9 is fixed to the lower part of the support block 25, and a coupling mechanism 29 for coupling to the conveyer device 7 is fixed to one end thereof.

The intermittently feeding device 9 is for intermittently feeding the transfer unit 3, and the lower part of the extrusion port of the extruder 2 is disposed in the periphery thereof. The intermittently feeding device 9 has a cam 32 supported by a motor 31 via support means that is not shown. The cam 32 rotates being driven by the motor 31 which is fixed. A cam follower 33 formed in a moving block 34 comes in mesh with a screw of the cam 32, and the moving block 34 moves along the support rail 22 accompanying the rotation of the cam 32. The motor 31 rotates at a constant speed, and the transfer unit 3 is intermittently fed depending upon the shapes of the cam 32 and of the cam follower 33.

FIG. 9 includes an enlarged view of the cam and the cam follower in the intermittently feeding device, and a diagram showing displacement curves of the cam. The cam 32 is a barrel cam. The spiral screw is formed surrounding the barrel cam, and pole-like or cylindrical cam followers 33 are protruding from the moving block 34. Each cam follower is held between the screws.

According to this embodiment as represented by the displacement curves, the operation section covers 270 degrees (allocated angle is 270 degrees) in example 1 and covers 180 degrees (allocated angle is 180 degrees) in example 2. If described with reference to the displacement curve of example 1, depending on the shape of the spiral screw, the cam 32 has no inclination of screw up to the rotational (phase) angle of 90 degrees, and the moving block 34 remains still. The moving block 34 can be displaced (moved) after the cam 32 has turned 90 degrees until it turns once. Therefore, the moving block 34 can be intermittently fed as indicated by an arrow e despite the motor 31 is rotating at a constant speed and, therefore, despite the cam 32 is rotating at a constant speed as indicated by an arrow d. In the examples 1 and 2, the portions indicated by arrows are points at where the moving block 34 moves at maximum speeds. It is recommended to cut the molten resin with the cutter at a timing of the maximum speed. The maximum speed in the intermittent feeding is determined by the rotational speed of the motor. Therefore, the speed of the cutter can be adjusted relying upon the rotational speed and the shape of the screw of the cam.

The above description has dealt with the barrel cam system as the most desired example for specifying the operation. It is, however, also allowable to use cams or mechanisms of any systems known per se. (parallel cam, Geneva drive, etc.). As for the operation curves of the cam, it is allowable to employ various kinds of curves known per se. In pursuing the high-speed operation as in the present invention, it is desired to use a deformed trapezoidal curve, a deformed sinusoidal curve or a curve improved therefrom.

Figure 5:
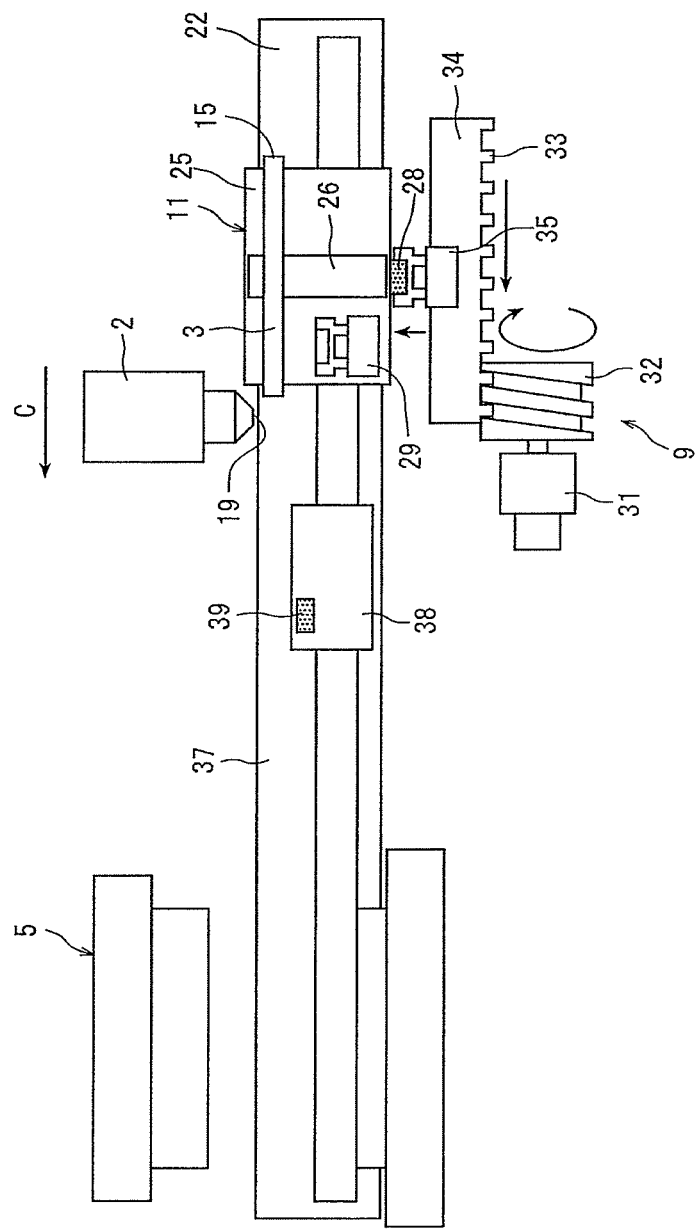
FIG. 5 is a side view of a state where a change-over device is coupled to an intermittently feeding device in the system for feeding the molten resin of FIG. 1.

Reverting to FIGS. 5 to 8, the coupling mechanism 35 is fixed to an upper part of the moving block 34. The coupling mechanism 35 is capable of being coupled to the locking member 28 of the change-over device 11 or disconnected therefrom. In a state where the coupling mechanism 35 and the locking member 28 are coupled together as shown in FIG. 5, the change-over device 11 (i.e., transfer unit 3) is intermittently fed following the movement of the moving block 34. The coupling mechanism 35 is capable of being coupled to, and disconnected from, the locking member 28 upon electrically changing over a solenoid.

Figure 6:
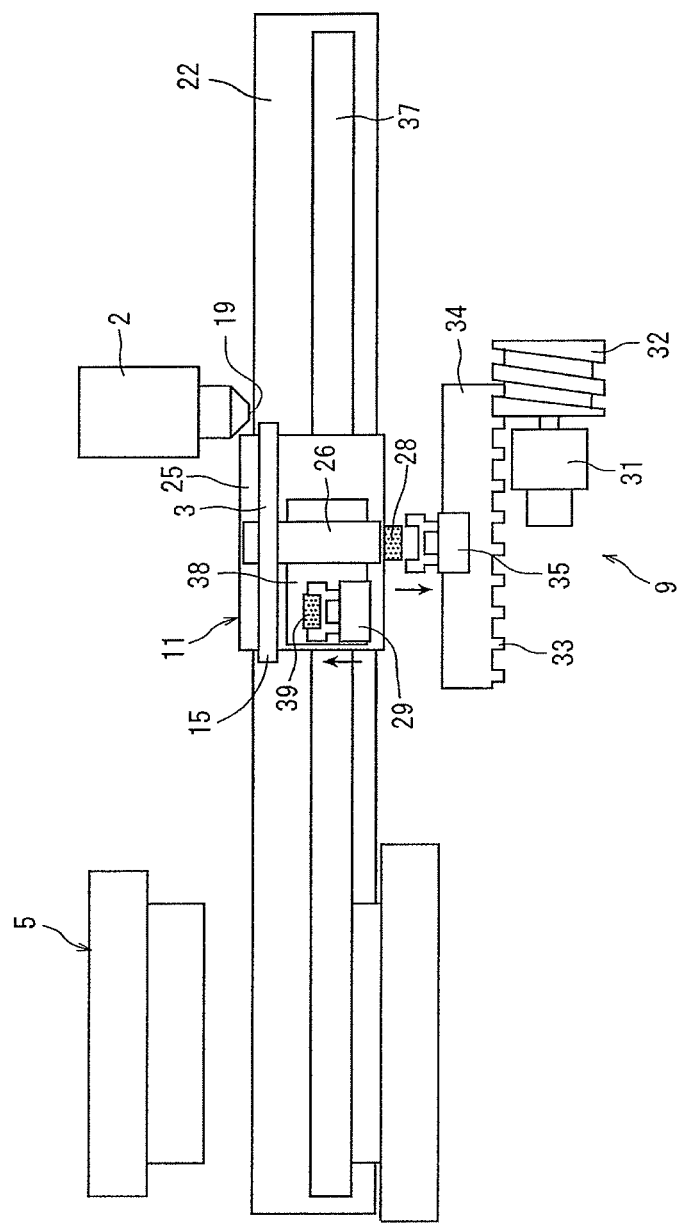
FIG. 6 is a side view of a state where the change-over device is disconnected from the intermittently feeding device and, instead, the change-over device is coupled to a conveyer device in the system for feeding the molten resin of FIG. 1.

The conveyer device 7 includes a linear motor 37 arranged along the support rail 22 and a linear motor table 38 that moves horizontally along the linear motor 37. The linear motor 37 extends from the side portion of one compression forming apparatus 5 up to the other compression forming apparatus 6. The linear motor table 38 is capable of moving from one end of the linear motor 37 up to the other end thereof. A locking member 39 is attached to the linear motor table 38. The locking member 39 is capable of being coupled to, and disconnected from, a coupling mechanism 29 of the change-over device 11. FIG. 6 shows a state where the change-over device 11 is disconnected from the intermittently feeding device 9, and is coupled to the conveyer device 7.

Figure 7:
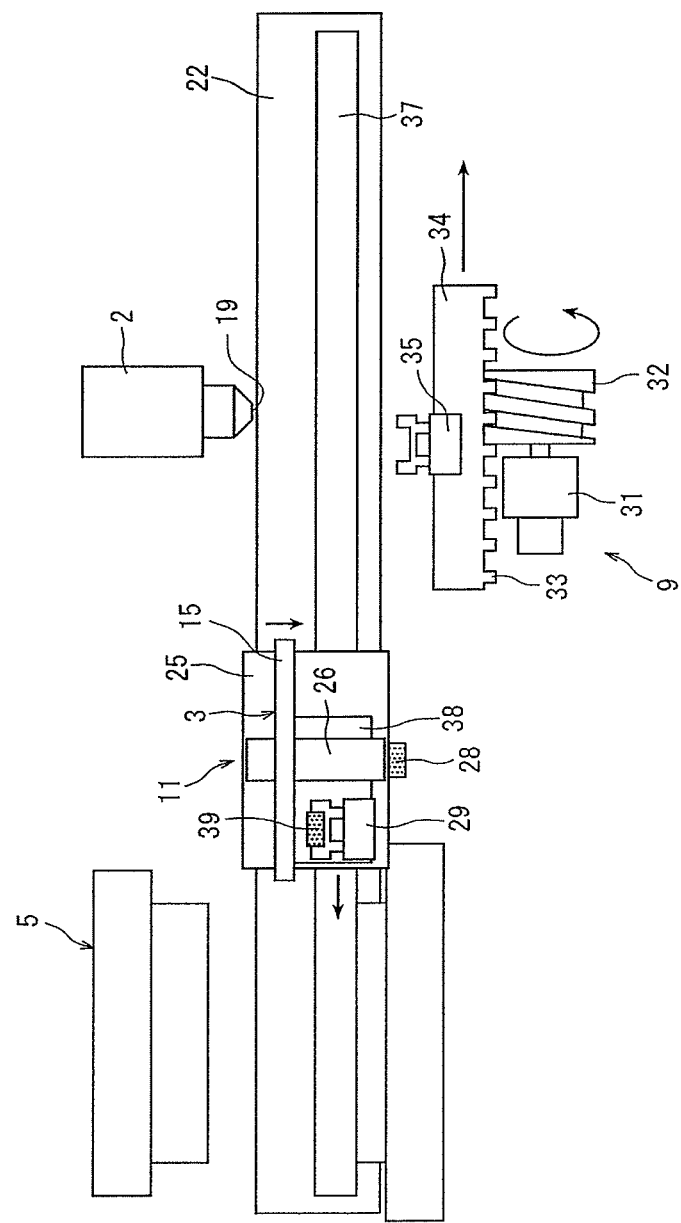
FIG. 7 is a side view of a state where the change-over device is coupled to the conveyer device, and the transfer unit is being transferred toward the compression forming apparatus in the system for feeding the molten resin of FIG. 1.
Figure 8:
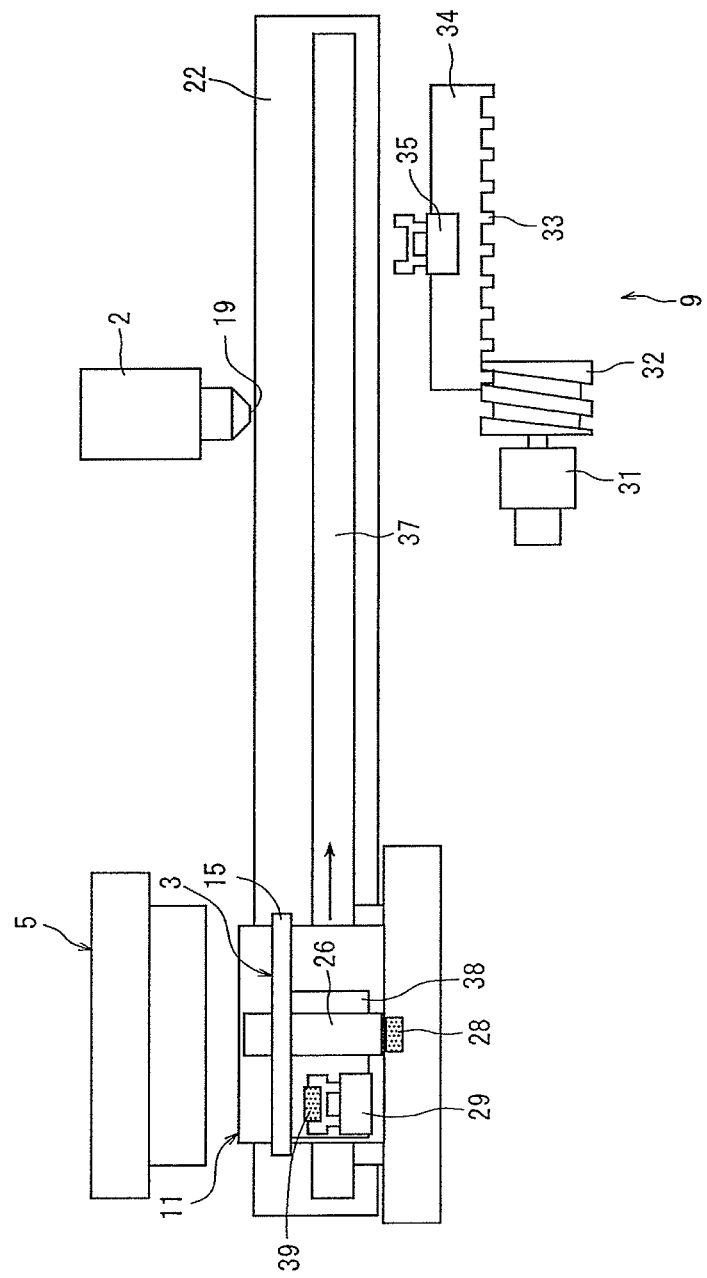
FIG. 8 is a side view of a state where the change-over device is coupled to the conveyer device, and the transfer unit is being transferred to the compression forming apparatus in the system for feeding the molten resin of FIG. 1.

In the state where the coupling mechanism 29 is coupled to the locking member 39, the change-over device 11 (i.e., transfer unit 3) is fed continuously following the movement of the linear motor table 38 (see FIG. 7). Like the coupling mechanism 35 attached to the intermittently feeding device 9, the coupling mechanism 29 is capable of being coupled to, and disconnected from, the locking member 39 upon electrically changing over a solenoid.

As described above, the change-over devices 11, 12 can be coupled to, and disconnected from, either the conveyer devices 7, 8 or the intermittently feeding devices 9, 10.

Referring to FIGS. 1, 3 and 10, the compression forming apparatuses 5 and 6 are arranged at both ends of the system 1 for feeding the molten resin. The compression forming apparatuses 5 and 6 are provided with many metal molds 45. The metal molds 45 are provided in a number equal to the number of the resin holders 20 arranged in the transfer units 3 and 4, and are arranged straight in three rows in the direction in which the transfer units 3 and 4 travel. The metal molds 45 are provided in a number of 21 in each of the compression forming apparatuses 5 and 6. The place where the metal molds 45 are arranged is just under the resin holders 20 in a state where the slide bars 18 of the transfer units 3, 4 are arranged on the outer side of the transfer units 3, 4 (see the right drawing in FIG. 3).

Referring to FIG. 10, the metal mold 45 has its male mold 46 arranged just under the resin holder 20, and a lift pin 28 is disposed in the male mold 46. At its descended position, the top surface of the lift pin 48 forms part of the crest surface of the male mold 46 and at its ascended position, the lift pin 48 protrudes upward beyond the male mold 46 and pierces into the molten resin held in the resin holder 20 as the transfer units 3, 4 are lowered. The lift pin 46 then descends to place the molten resin on the top surface of the male mold 46.

The female molds are capable of moving in the vertical direction, and are caused to move just over the male molds 46 after the transfer units 3, 4 are separated away from the compression forming apparatuses 5, 6 so as to compression-form the molten resin.

Next, the operation of the embodiment will be described.

Figure 11:
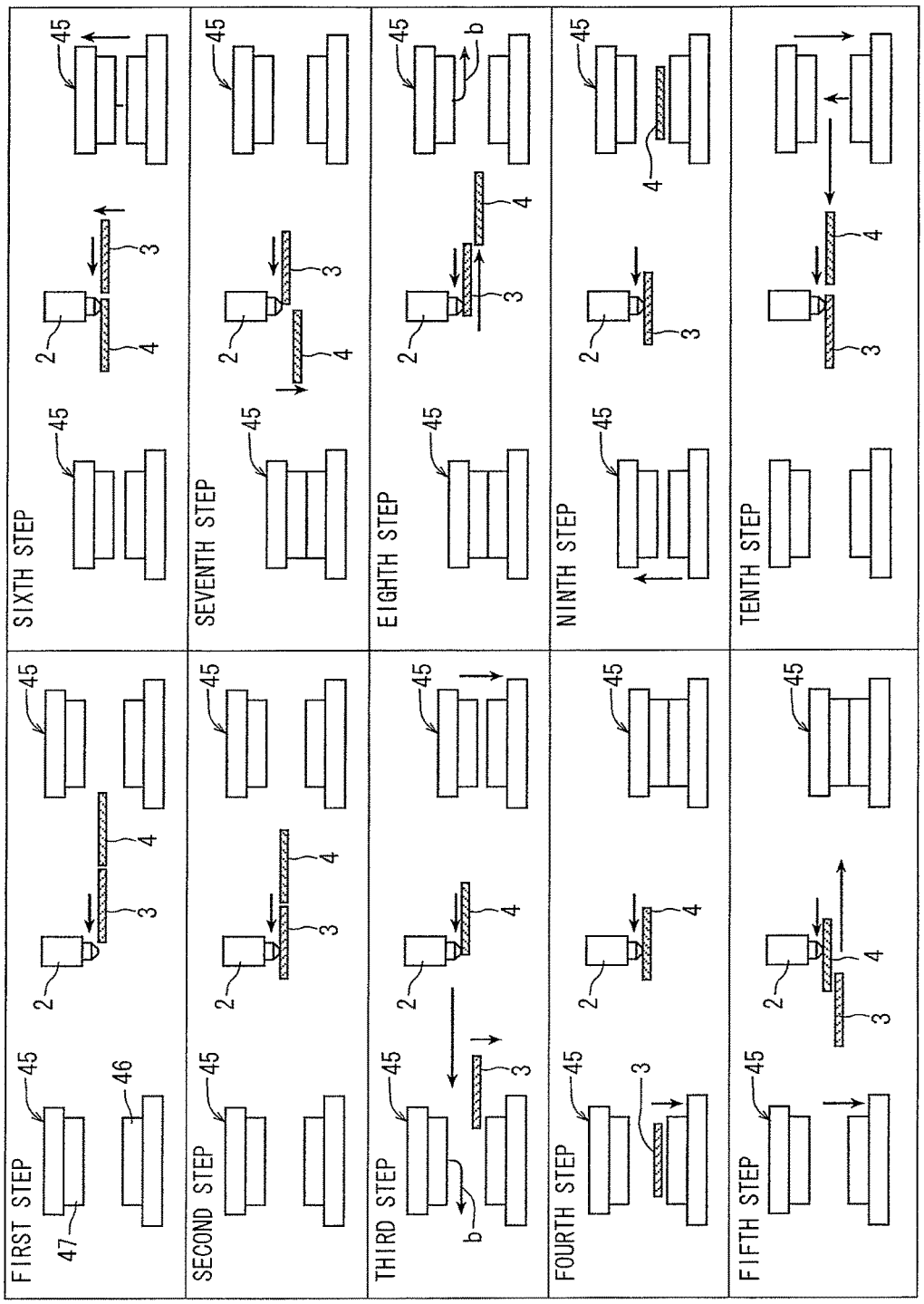
FIG. 11 is a side view schematically illustrating the first step through up to the tenth step in a method of feeding the molten resin according to an embodiment of the present invention.

FIG. 11 is a side view schematically illustrating the first step through up to the tenth step in the method of feeding the molten resin according to the embodiment of the present invention.

At the start of operation of the system 1 for feeding the molten resin as shown in the first step in FIG. 11, the first transfer unit 3 is disposed under the extrusion port 19 of the extruder 2 and the second transfer unit 4 is disposed behind the first transfer unit 3. Upon rotating the drive motor 42, the transfer units 3 and 4 move the slide bars 18 inward as shown in FIG. 3 so that the resin holders 20 (of a number of 21) are arranged in one row. The change-over device 11 of the first transfer unit 3 is coupled to the intermittently feeding device 9 while the second transfer unit 4 is coupled to the conveyer device 8. The metal molds 45 are being opened.

In this state, the extruder 2 heats, melts and mixes the synthetic resin materials such as polyethylene terephthalate and the like, and conveys the synthetic resin to the extrusion port 19 of the extrusion nozzle. The first transfer unit 3 is intermittently fed by driving the intermittently feeding device 9. The holder bodies 51, 52 in the transfer units 3, 4 have been closed. When the first resin holder 20 of the row is conveyed to just under the extrusion port 19, the synthetic resin extruded from the extrusion port 19 is cut by the cutter 53 and is separated away from the extrusion port 19. The synthetic resin that is cut off is held by being received by the holder bodies 51 and 52 that are in the closed state. The intermittently feeding device 9 increases the moving speed of the resin holder 20 at a moment when the molten resin is cut, and causes the moving speed to become zero or slowed down right after the molten resin is cut. After the molten resin is held by being received by the first resin holder 20, the subsequent resin holders 20 are successively and intermittently fed to just under the extrusion port 19 (second step).

After the molten resin is held in all of the resin holders 20, the change-over device 11 of the first transfer unit 13 is coupled to the conveyer device 7, and is disconnected from the intermittently feeding device 9. That is, the locking member 39 is coupled to the coupling mechanism 29 while the locking member 28 is disconnected from the coupling mechanism 35.

On the other hand, the change-over device 12 of the second transfer unit 4 is coupled to the intermittently feeding device 10 and is disconnected from the conveyer device 8, and the first resin holder 20 in the second transfer unit 4 is disposed just under the extrusion port 19. The first transfer unit 3 is conveyed by the conveyer device 7 to the compression forming apparatus 5 (third step: see. FIG. 1).

Next, the first transfer unit 3 is conveyed to the compression forming apparatus 5, and the resin holder 20 is disposed just over the corresponding metal mold 45. At this moment, the male mold 46 disposes the lift pin 48 at its ascended position, and the first transfer unit 3 lowers the resin holder 20 down so that the molten resin is pierced by the lift pin 48 to some extent. Thereafter, the resin holder 20 opens the holder body 51 to release the molten resin, and the first transfer unit 3 is moved up. The male mold 46 lowers the lift pin 48 so that the molten resin is placed on the male mold.

On the other hand, the second transfer unit 4 is intermittently transferred by the intermittently transferring device 10, and holds the molten resin discharged from the extrusion port 19 according to the same procedure as is done by the first transfer unit 2 (fourth step: see FIG. 2).

While the molten resin is being held by the resin holders 20 of the second transfer unit 4, the first transfer unit 3 that has fed the molten resin to the male molds 46 is disposed by the actuator 26 at a position lower than the second transfer unit 4 separated away from the metal molds 45. Next, the first transfer unit 3 is conveyed by the conveyer device 7 toward the compression forming apparatus 6 on the opposite side traveling under the second transfer unit 4. In the compression forming apparatus 5, the female molds 47 start moving down (fifth step).

Just after passed through under the second transfer unit 4, the first transfer unit 3 is disposed at the ascended position by the actuator 26, i.e., disposed on the upstream just behind the second transfer unit 4. Here, upon driving the drive motor 42, the pair of slide bars 18 is moved outward, and the resin holders 20 aligned in one row are filed off into three rows. The change-over device 11 of the first transfer unit 3 is coupled to the intermittently feeding device 9 and is disconnected from the conveyer device 7.

When the first transfer unit 3 assumes the stand by state behind the second transfer unit 4, the gap between the final resin holder 20 in the second transfer unit 4 and the first resin holder 20 in the first transfer unit 3 may be rendered to be equal to the pitch in the intermittent feeding to maintain synchronism. If the timing cannot be brought in match, however, the timing can be attained by adjusting, for example, the rotational speed of the motor 31.

In the second transfer unit 4, on the other hand, the molten resin has been fed to all of the resin holders 20. Therefore, the change-over device 12 of the second transfer unit 4 is coupled to the conveyer device 8 and is disconnected from the intermittently feeding device 10 (sixth step).

When the molten resin starts being fed into the resin holders in the first transfer unit 3, the second transfer unit 4 is disposed at the descended position by the actuator 26. In the compression forming apparatus 5, on the other hand, the female molds 47 are overlapped on the male molds 46 to conduct the compression forming (seventh step).

Next, the second transfer unit 4 is conveyed toward the other compression forming apparatus 5 traveling under the first transfer unit 3. In the first transfer unit 3, the molten resin is held in the resin holders 20 accompanying the intermittently feeding motion (eighth step).

When the molten resin discharged from the extrusion port 19 is held in the resin holders 20 of the first transfer unit 3, the second transfer unit 4 is conveyed to the other compression forming apparatus 6. Then, the molten resin is placed from the resin holders 20 onto the male molds 46 of the metal molds 45. In the compression forming apparatus 5, the metal molds 45 are opened (ninth step).

After the molten resin has been handed over to all of the male molds 46, the second transfer unit 4 is moved toward the extrusion port 19 and is disposed behind (on the upstream of) the first transfer unit 3. In the other compression forming apparatus 6, the female molds 47 start descending (tenth step).

After the end of the tenth step, the procedure returns back to the third step. The first step and the second step are used only at the start of the procedure but are not used again. Thereafter, the third step through up to the tenth step are repeated as one cycle.

If closely described, in the third step of the second cycle, the articles formed by the compression forming apparatus 5 in the last cycle are taken out (arrow b) and in the fourth and fifth steps, the compression forming is executed by the other compression forming apparatus 6. In the seventh step, the formed articles are cooled and in the eighth step, the articles compression-formed by the compression forming apparatus 6 in the last cycle are taken out (arrow b).

The present invention is provided with the intermittently feeding devices to intermittently feed the resin holders 20 (transfer units 3, 4) making it possible to decrease the pitch between the resin holders 20. Despite the resin holders 20 are aligned in one row, therefore, the row of the resin holders does not become so long and the apparatus can be realized in a small size.

Since the resin holders 20 are intermittently fed by the intermittently feeding device, the molten resin can be received while the resin holders 20 are at rest in their intermittent motion. Since the resin holders that are intermittently fed are relatively light in weight, the feeding operation can be carried out at a high speed, which is an advantage.

By using the transfer units in a pair, the one transfer unit can be placed stand by behind (upstream of) the other transfer unit while the resin holders in the other transfer unit are receiving the molten resin making it possible to continuously feed the molten resin.

Upon rotating the drive motor 42, the slide bars 18 in the transfer units 3 and 4 are moved outward as shown in FIG. 3 enabling the resin holders 20 to be rearranged from one row into three rows and, therefore, shortening the length of the portions where the metal molds 45 are arranged in the compression forming apparatuses 5, 6 into about one-third (1/plural rows). The length of the apparatus does not increase in one way.

The molten resin is received in one way from the extrusion port 19 (direction of arrow c in FIG. 5) and, besides, the pair of transfer units 3 and 4 is shunt while being moved up and down by the lift means. Therefore, the transfer units can be shunt in a circulating manner requiring a small space. Besides, the motion of the transfer units 3, 4 does not become complex contributing to saving energy.

Though the embodiment of the invention was closely described above with reference to the accompanying drawings, it should be noted that the invention is in no way limited to the above embodiment only but can be modified or changed in a variety of other ways without departing from the scope of the invention.

In the above embodiment as shown in FIG. 4(*a*), the cutter 53 was disposed in the resin holder 20. However, as shown in FIG. 4(*a*), the cutter 53 may be disposed near the extrusion port 19 to cut the molten resin. As for the resin holders 20, the pin 48 in the metal mold was so disposed to pierce the molten resin to some extent. The molten resin, however, may be thrown down from the resin holders 20.

The above embodiment was provided with the two compression forming apparatuses 5 and 6. The compression forming, however, may be carried out by providing only one compression forming apparatus.

For instance, when the compression forming apparatus 5 only is used in FIG. 11 (omitting the compression forming apparatus 6), the compression forming can be carried out by repeating the procedures from the first step through up to the sixth step. In the first and sixth steps, however, the first transfer unit 3 and the second transfer unit 4 are moved in reverse order.

In the embodiment, the conveyer devices 7, 8 and the intermittently feeding devices 9, 10 are coupled together and disconnected from each other by using the change-over devices 11, 12. However, the intermittently feeding motion and the continuous motion to the compression forming apparatuses may be executed by using the linear motor only. That is, in the above embodiment, the resin holders 20 were intermittently fed by using the cam mechanism. The resin holders 20, however, may be intermittently fed by turning the linear motor on and off or by adjusting the speed thereof. It is also allowable to use an electric actuator which comprises a motor and a ball screw instead of using the linear motor.

DESCRIPTION OF REFERENCE NUMERALS 1 system for feeding a molten resin
2 extruder
3, 4 transfer units
5, 6 compression forming apparatuses
7, 8 conveyer devices
9, 10 intermittently feeding devices
11, 12 change-over devices
15 frames
18 slide bars
19 extrusion port
20 resin holders
22, 23 support rails
25 support block
26 actuator
28, 39 locking members
29, 35 coupling mechanisms
32 cam
33 cam follower
34 moving block
37 linear motor
38 linear motor table
45 metal molds
46 male molds
47 female molds
48 lift pin
51, 52 holder bodies
53 cutter

The invention claimed is:

1. A system for feeding a molten resin, comprising:
an extruder for extruding the molten resin through an extrusion port;
resin holders for receiving the molten resin from said extrusion port;
transfer units equipped with a plurality of said resin holders; and
compression forming apparatuses having a plurality of metal molds;
intermittently feeding devices which vary the moving speed of said transfer units at a moment when said resin holder receives the molten resin;
said intermittently feeding devices configured to feed said transfer units at a feed speed which is zero or is slowed down at a position where said resin holder receives the molten resin so that the molten resin is continually and successively fed into said resin holders from said extrusion port;
the metal molds are disposed in a plurality of rows in said compression forming apparatuses;
said transfer units include a file-off mechanism for filing off said resin holders from a state of one row to a plurality of rows, the file-off mechanism aligning said resin holders in one row at the molten resin extrusion port and filing off said resin holders to a plurality of rows to meet the positions of the metal molds at the time of feeding the molten resin to the metal molds;
conveyer devices for moving said transfer units straight to said metal molds; and
change-over devices for changing over said intermittently feeding devices and said conveyer devices for said transfer units.

2. The system for feeding the molten resin according to claim 1, wherein the compression forming apparatuses and the pair of the transfer units are located on both sides of said extrusion port; and
the transfer units include a lift, and are configured to be alternately transferred to a position to receive said molten resin in a manner that one transfer unit travels under the other transfer unit enabling the molten resin to be continually fed to the resin holders.

* * * * *